(12) United States Patent
Takahashi

(10) Patent No.: US 7,978,264 B2
(45) Date of Patent: Jul. 12, 2011

(54) DIGITAL CAMERA

(75) Inventor: Keita Takahashi, Sagamihara (JP)

(73) Assignee: Olympus Imaging Corp. (JP)

( * ) Notice: Subject to any disclaimer, the term of this patent is extended or adjusted under 35 U.S.C. 154(b) by 436 days.

(21) Appl. No.: 12/274,586

(22) Filed: Nov. 20, 2008

(65) Prior Publication Data

US 2009/0135286 A1 May 28, 2009

(30) Foreign Application Priority Data

Nov. 22, 2007 (JP) ................................. 2007-303350

(51) Int. Cl.
*H04N 5/225* (2006.01)
*G02B 13/16* (2006.01)
*G02B 7/02* (2006.01)
*G03B 17/00* (2006.01)

(52) U.S. Cl. ......... 348/374; 348/335; 396/448; 359/813

(58) Field of Classification Search ............ 348/208.99, 348/335, 337, 373–376; 396/52, 55, 421, 396/535, 540, 541, 448; 359/813
See application file for complete search history.

(56) References Cited

U.S. PATENT DOCUMENTS

| 6,837,628 | B2 * | 1/2005 | Shintani | 396/351 |
|---|---|---|---|---|
| 6,956,610 | B1 * | 10/2005 | Walls | 348/340 |
| 7,182,529 | B2 * | 2/2007 | Kurosawa | 396/358 |
| 7,817,353 | B2 * | 10/2010 | Oh et al. | 359/695 |
| 7,853,143 | B2 * | 12/2010 | Miyazawa et al. | 396/535 |
| 2005/0168834 | A1 * | 8/2005 | Matsumoto et al. | 359/694 |
| 2007/0177867 | A1 | 8/2007 | Yuge et al. | |
| 2009/0109319 | A1 * | 4/2009 | Takatsuka et al. | 348/340 |
| 2009/0135298 | A1 * | 5/2009 | Kaneko et al. | 348/374 |
| 2010/0188516 | A1 * | 7/2010 | Kaneko et al. | 348/208.4 |

FOREIGN PATENT DOCUMENTS

| CN | 101008766 | | 8/2007 |
|---|---|---|---|
| JP | 11-258690 | | 9/1999 |
| JP | 2003-258971 | | 9/2003 |
| JP | 2005-306078 | | 11/2005 |
| JP | 2006-040503 | | 2/2006 |
| JP | 2006-080987 | | 3/2006 |
| JP | 2007-034123 | | 2/2007 |
| JP | 2007199208 A | * | 8/2007 |
| JP | 2009128442 A | * | 6/2009 |
| JP | 2010177965 A | * | 8/2010 |

* cited by examiner

*Primary Examiner* — John M Villecco
(74) *Attorney, Agent, or Firm* — Volpe and Koenig, P.C.

(57) ABSTRACT

A digital camera of the present invention has: a lens group reflecting photographic object light entering along a first optical axis to a second optical axis direction perpendicular to the first optical axis and forming an image of light flux thereof on an image pickup device located on the second optical axis; and a driving force generating member blocking or allowing entering light flux along the first optical axis by driving a barrier member, and has a camera body having an optical housing, a containing portion containing the optical housing and the barrier member, and having a transmitting member transmitting driving force of the driving force generating member to the barrier member, wherein the coupling relation between the driving force generating member and the driving force transmitting member is maintained.

12 Claims, 12 Drawing Sheets

DIGITAL CAMERA

This application claims benefit of Japanese Application No. 2007-303350 filed in Japan on Nov. 22, 2007, the contents of which are incorporated herein by this reference.

BACKGROUND OF THE INVENTION

1. Field of the Invention

The present invention relates to a digital camera having a bending optical system and a lens barrier member housed in a camera body.

2. Description of the Related Art

Conventionally, various digital cameras have been put to practical use, which have a lens barrel unit including a plurality of optical lenses and the like, an image pickup unit including an image pickup device for subjecting an optical image of a photographic object formed by the optical lenses to photoelectric conversion, and the like.

As for these digital cameras, reduction of size of the whole device is always desired so that a user can always carry it with her/him and use it at ease at any place.

On the other hand, if a user always carries a digital camera, possibility increases that she/he, while carrying it, accidentally drops it or unexpectedly allows it to collide into a wall or the like, for example. However, since such a digital camera is an extremely precisely configured device, if shock force is applied thereto from outside, the external force can influence inner components, which can cause breakage or failure of the inner components.

Thus, as for conventional small size devices such as digital cameras, in order to cope with shock such as dropping, a variety of ones have been proposed, which are configured with a so-called floating structure which is structured such that inner components in a device body are movable and which has a buffer member provided between an outer surface of the movable inner components and an inner surface of the device body, in Japanese Patent Application Laid-Open Publication No. 2003-258971, Japanese Patent Application Laid-Open Publication No. 2005-306078, Japanese Patent Application Laid-Open Publication No. 2006-80987, Japanese Patent Application Laid-Open Publication No. 2006-40503 and the like.

In small size devices with such floating structure, when external shock force is applied to the exterior of the device body, the shock force is absorbed by the buffer member being compressed.

The small size device disclosed by the above-mentioned Japanese Patent Application Laid-Open Publication No. 2003-258971 is a cellular phone or the like having a body case which retains a camera unit and defines a contour, being configured with a buffer member provided in planes between a unit case and the body case respectively along a direction of movement of lenses (optical axis direction; X-axis direction) and a direction perpendicular thereto (Y-axis direction) in order to alleviate shock force applied to the camera unit through the body case. In the device described in the Publication, a cam member is adopted as a driving member for moving a photographing optical system provided in the camera unit along a guide shaft.

The small size device disclosed by the above-mentioned Japanese Patent Application Laid-Open Publication No. 2005-306078 is a vehicle-mounted player apparatus installed in a dashboard in a vehicle interior, being configured with a buffer member interposed between an outer housing incorporated into the dashboard and an apparatus body housed in the outer housing.

The small size devices disclosed by the above-mentioned Japanese Patent Application Laid-Open Publication No. 2006-80987 and the above-mentioned Japanese Patent Application Laid-Open Publication No. 2006-40503 are configured with a buffer member interposed between an outer surface of a slot portion removably housing a disk-shaped recording medium cartridge which is housed in a device body and other inner components.

SUMMARY OF THE INVENTION

A digital camera of the present invention has: a lens group for reflecting photographic object light entering along a first optical axis to a second optical axis direction perpendicular to the first optical axis and forming an image of the reflected photographic object light on an image pickup device located on the second optical axis; and a driving force generating member for generating driving force for driving the lens group as well as driving a barrier member which moves between a position to block the photographic object light entering along the first optical axis and a position to allow entrance of the photographic object light entering along the first optical axis; and a camera body, wherein the camera body has an optical housing being in a flat shape as a whole, a containing portion for containing the optical housing so as to be slidable only in the second optical axis direction and the barrier member arranged, as well as a transmitting member for transmitting driving force from the driving force generating member to the barrier member, shock absorbing means is provided between an inner surface portion of the containing portion and an outer surface portion of the flat optical housing of the camera body, and a coupling relation between the driving force generating member and the transmitting member is maintained even when the optical housing is displaced by sliding only in the second optical axis direction relatively in the containing portion of the camera body by shock.

DETAILED DESCRIPTION OF THE PREFERRED EMBODIMENTS(S)

An embodiment of the present invention will be described below with reference to the drawings.

First, the schematic configuration of the present invention will be described using FIGS. 1 to 7. In FIG. 2, part of the back side of the digital camera is torn apart to show the arrangement of an optical housing provided therein.

Figure 1:
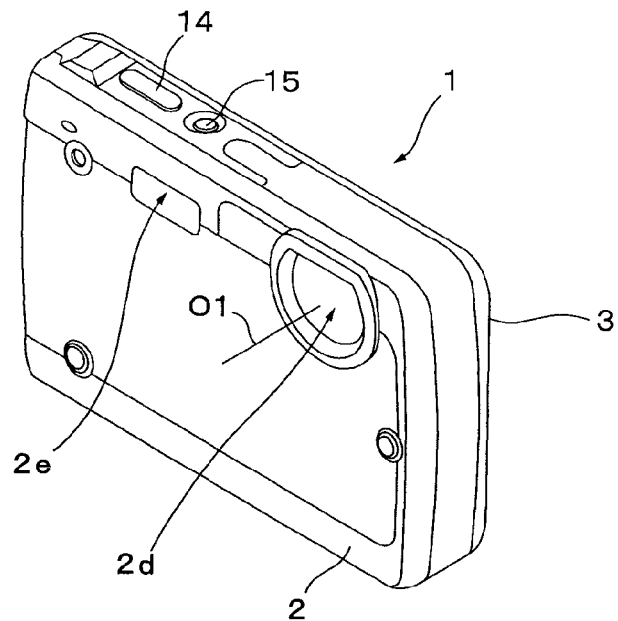
FIG. 1 is a perspective view showing appearance of a digital camera.
Figure 2:
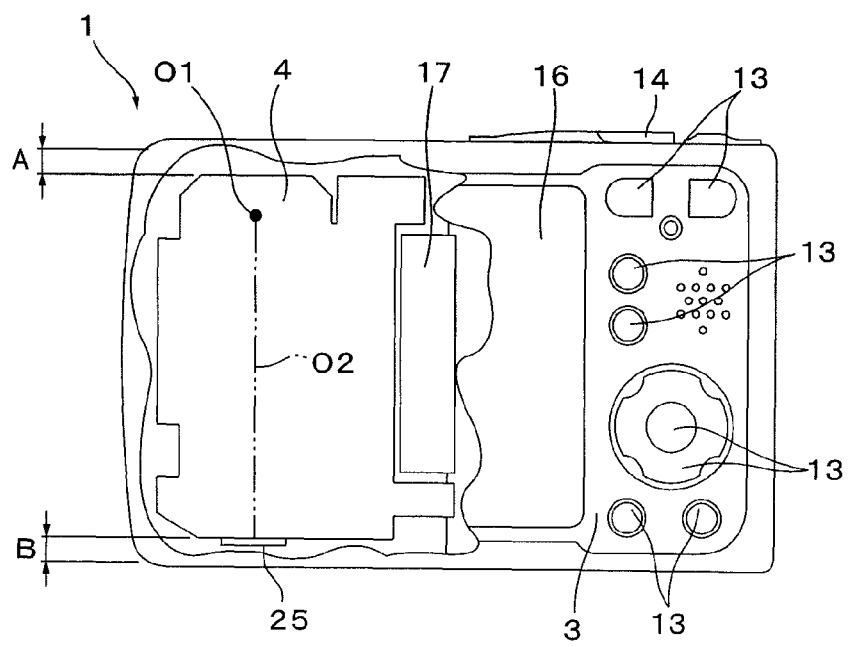
FIG. 2 is a rear view showing the rear side of the digital camera.

As shown in FIGS. 1 and 2, a digital camera 1 adopted in the present embodiment is mainly constituted by a camera body in the form of a substantially rectangular parallelepiped box, inner components incorporated in the camera body such as an optical housing 4 having a flat shape as a whole and various units and electric circuits, various operation members (14, 15) disposed on the surface of the camera body and coupled to the inner components, and the like.

The optical housing 4 (described in detail in FIG. 8) is mainly constituted by a bending optical system and a lens barrel unit including driving devices for shutters and lenses. The bending optical system bends light of a photographic object entering along a first optical axis toward the direction of a second optical axis O2 perpendicular to the first optical axis O1, and forms an optical image of the photographic object on the light-receiving surface of an image pickup device arranged on the second optical axis O2.

As shown in FIG. 1, the camera body is formed in a shape of a box by a front cover member 2 and a rear cover member 3 being combined, corner regions of the cover members 2, 3 being fixed to each other using coupling members such as screws. In this case, the front cover member 2 is formed in a shape covering the front surface, both side surfaces, top surface and bottom surface, while the rear cover member 3 is formed in a shape mainly covering the rear side. Further, the optical housing 4 is movably arranged at a predetermined region in the camera body.

In the rear cover member 3 are provided a plurality of operation members 13 which are used when various kinds of operation input to be executed at the time of photographing and reproduction are performed, as well as a display portion 16 of a display device. Examples of the operation members 13 are a T button and a W button for zooming, an operation mode setting button, a photographing and reproduction operation switching button, a menu display operation button, a photographing area switching button (macro button), a strobe mode switching button, a self-timer button, a exposure correction switching button and the like.

In a substantially middle portion of the rear cover member 3, a display window 16a (see FIG. 4) opens such that display of the display portion 16 can be exposed toward the exterior. Further, on the top side of the camera body, operation members such as a shutter button 14 and a power source operating button 15 are disposed.

In the front cover member 2, openings are formed such as a photographing window 2d for allowing light flux to enter the optical housing 4 (not shown in FIG. 1) provided in the camera body, and a light generating window 2e of a flash light generating device.

Figure 4:
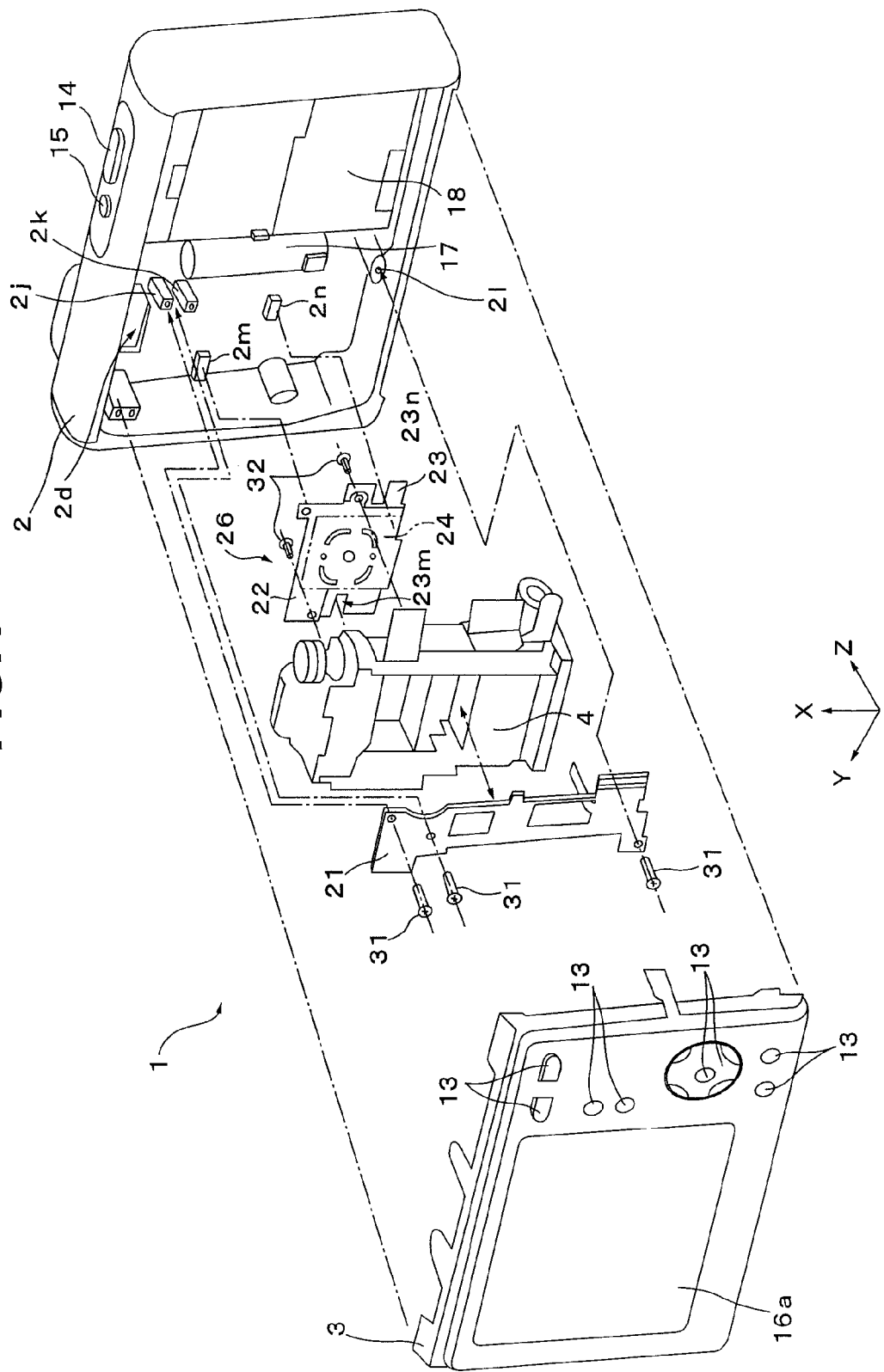
FIG. 4 is an exploded perspective view showing an assembly structure of the camera body and the optical housing of the digital camera.

In the inner space of the camera body thus configured, a plurality of inner constituent units such as the optical housing 4 and the display device, a plurality of circuit boards and electrical members forming various electric circuits (for example, a main board 18 and a strobe capacitor 17 shown in FIG. 4) and the like are disposed respectively in predetermined regions.

The optical housing 4 is formed in a flat shape as a whole, and has a lens barrel unit constituting a bending optical system including a plurality of optical lenses, a lens retaining frame therefor and the like. Light flux from a photographic object enters the optical housing 4 along the first optical axis O1 through the photographing window 2d (see FIG. 1) of the front cover member 2, is bent toward a direction perpendicular to the first optical axis O1 by a prism (see FIG. 8), and is guided toward an image pickup device 25 (see FIG. 3) disposed in the bottom side of the optical housing 4 on the second optical axis O2, which is the optical axis after bending, thereby forming an optical image of the photographic object on the light-receiving surface of the image pickup device 25. The essential configuration of the optical housing 4 will be described in detail later.

In the optical housing 4, a shutter unit, a shutter driving motor for driving the shutter unit, a focusing motor, a zooming motor, driving force transmitting members for transmitting the driving force of the motors to predetermined regions, a lens barrier unit having a lens barrier member 51 (see FIG. 6), an electrical board having the image pickup device 25 (see FIG. 3) mounted and the like, for example, are integrally configured in addition to the above-mentioned components, being integrally movable in the direction of the optical axis O2.

In the camera body of a digital camera 1, the optical housing 4 is disposed at a predetermined region in the camera body nearer to one side as shown in FIG. 2, for example. The arrangement of the optical housing 4 in the camera body is not limited to the example of the present embodiment; the optical housing 4 may also be disposed at the substantially middle portion in the camera body, for example.

Figure 3:
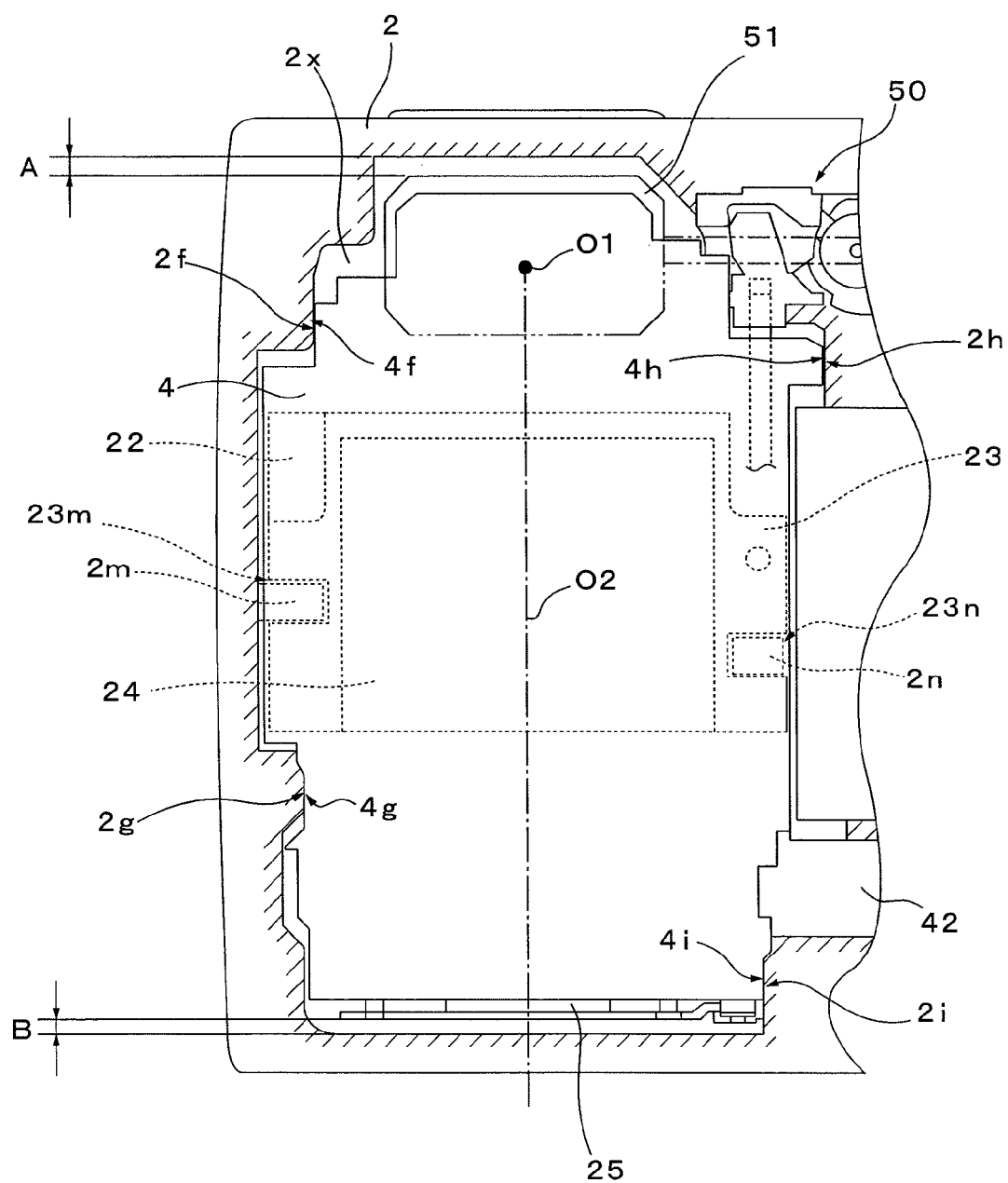
FIG. 3 is an enlarged view of essential part, schematically showing a state of arrangement of an optical housing with respect to a camera body of the digital camera.

As shown in FIG. 3, a containing portion 2x is formed in the inner surface of the front cover member 2 of the digital camera 1 at the region inside a border indicated by oblique lines in the figure. The optical housing 4 is slidably contained in the containing portion 2x with its movement being allowed only in the direction along the second optical axis O2.

The containing portion 2x is formed in the inner surface of the front cover member 2 of the digital camera 1 with stairsteps in accordance with the outer shape of the optical housing 4, with support portions 2f, 2g, 2h, 2i provided on both sides of the second optical axis O2 of the optical housing 4. When the optical housing 4 is arranged in the containing portion 2x, regions near the four corners of the optical housing 4, that is, regions denoted by reference numerals 4f, 4g, 4h, 4i shown in FIG. 3 are in surface contact with the support portions 2f, 2g, 2h, 2i.

That is, by the regions 4f, 4g, 4h, 4i near the four corners of the optical housing 4 being respectively in surface contact with the support portions 2f, 2g, 2h, 2i of the containing portion 2x, the optical housing 4 is supported in the containing portion 2x of the front cover member 2 with its sliding movement being allowed only in the direction along the second optical axis O2, as well as its movement in the Y-axis direction shown in FIG. 4, which is a direction perpendicular to the second optical axis O2, being restricted.

Further, a plate form holding member 21 (see FIG. 4) is disposed on the rear-side outer surface of the optical housing 4; the plate form holding member 21 is fixed by screwing by a plurality of screws 31 (see FIG. 4) to fixing portions 2*j*, 2*k*, 2*l* provided on the inner surface of the front cover member 2. That is, the optical housing 4 is disposed in a form sandwiched between the inner surface of the front cover member 2 and the plate form holding member 21, being arranged in the containing portion 2*x* of the front cover member 2. In this way, therefore, movement of the optical housing 4 in the direction along the Z-axis shown in FIG. 4, which is a direction along the first optical axis O1, is restricted.

Figure 5:
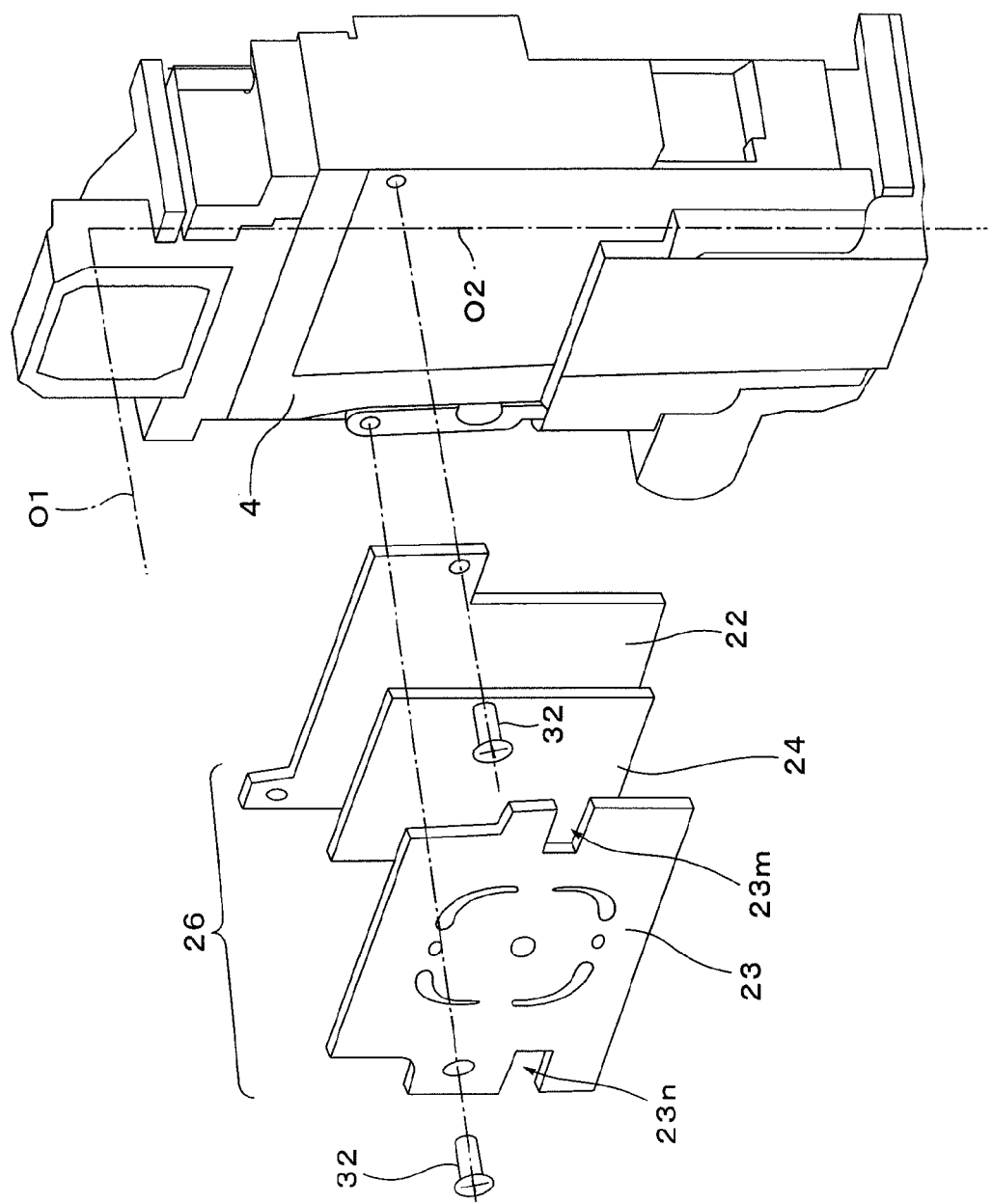
FIG. 5 is an exploded perspective view of essential part, showing a shock absorbing body disposed on the front surface of the optical housing of the digital camera, being exploded.
Figure 6:
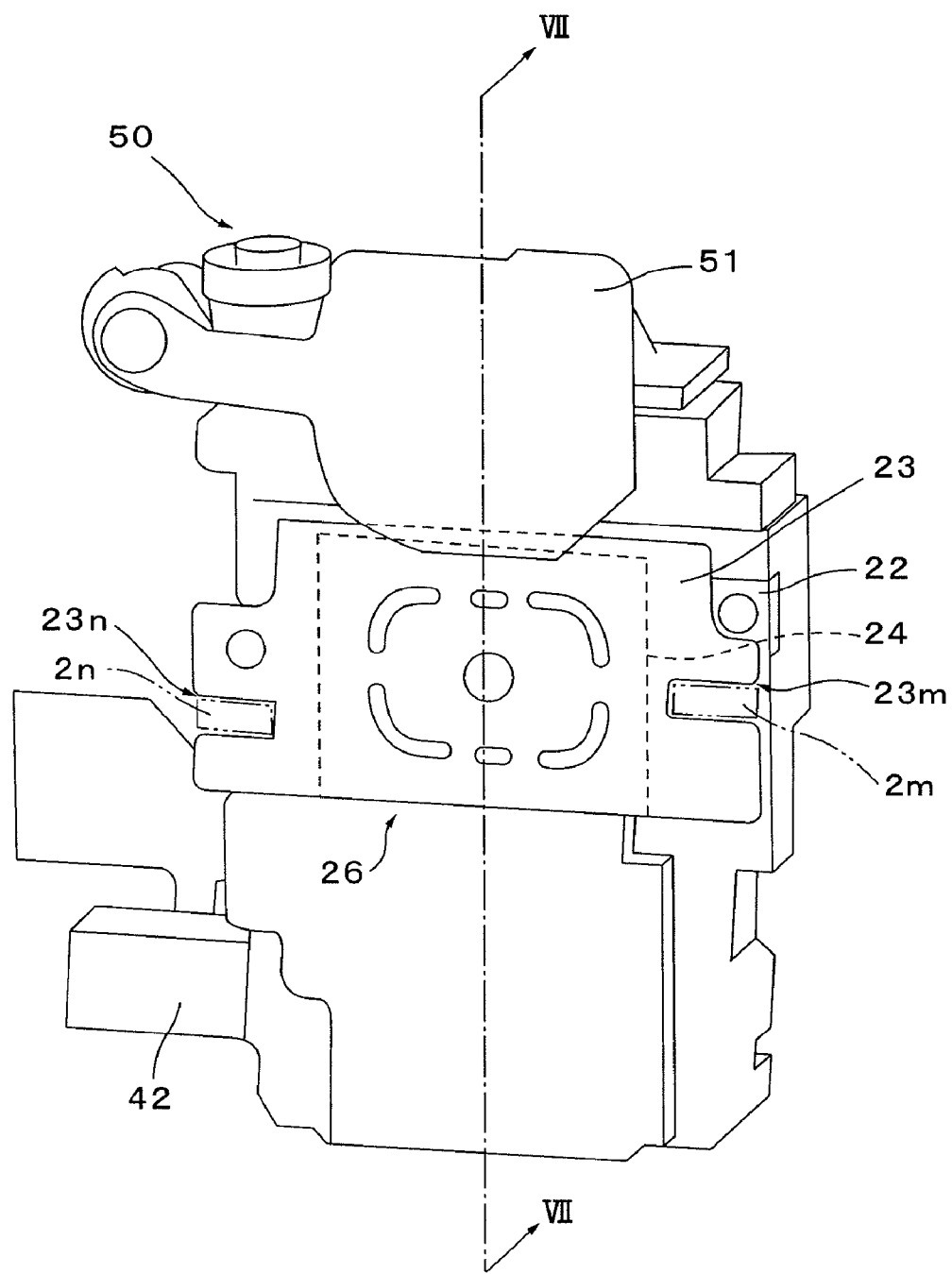
FIG. 6 is an assembly view showing a state in which a lens barrier member and a shock absorbing body are attached to the front surface of the optical housing of the digital camera.
Figure 7:
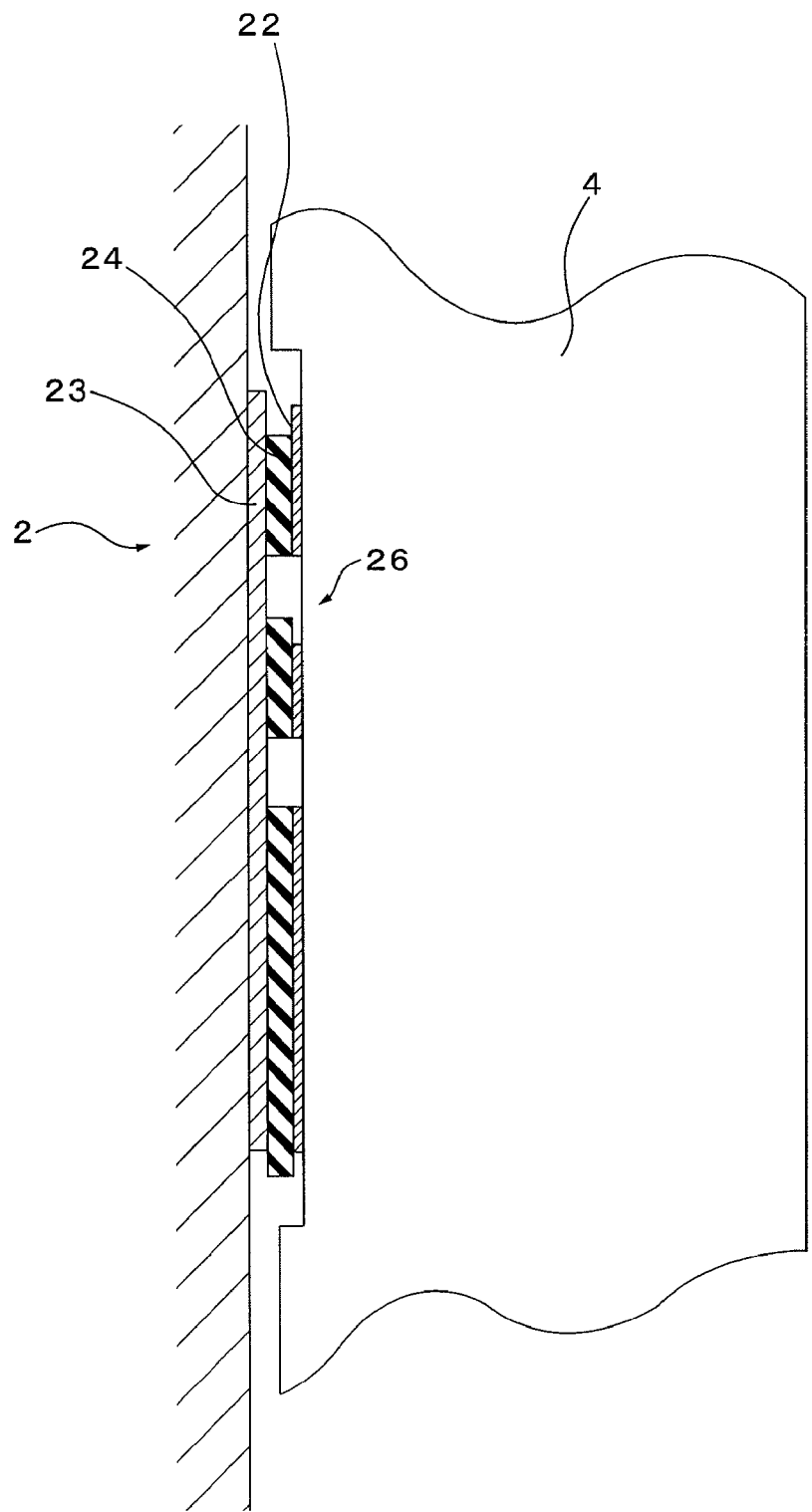
FIG. 7 is a sectional view of the attachment region of the shock absorbing member of the optical housing of the digital camera along VII-VII of FIG. 6.

Meanwhile, as shown in FIGS. 4 and 5, shock absorbing means 26 is disposed on the front side of the optical housing 4. The shock absorbing means 26 has a shock absorbing member 24 and first and second thin plate members 22, 23 sandwiching the shock absorbing member 24. The shock absorbing member 24 is made of a resilient butyl-based rubber member or the like, and is formed in the shape of a thin flat plate. The first and second thin plate members 22, 23 are made of metal, resin or the like; the front and rear sides of the shock absorbing member 24 are sandwiched by the thin plate members 22, 23. Both sides of the shock absorbing member 24 are fixed by bonding with adhesive or the like to the respective thin plate members 22, 23.

The shock absorbing means 26 is arranged between the outer surface (front surface) of the optical housing 4 arranged in the containing portion 2*x* of the camera body and the containing portion 2*x* of the inner surface of the front cover member 2 facing thereto. More specifically, the first thin plate member 22 is screwed onto the front surface of the optical housing 4 by means of screws 32 (see FIG. 4) between the optical housing 4 and the front cover member 2. The second thin plate member 23 is fixed to a predetermined region of the containing portion 2*x* on the camera body side of the front cover member 2. In addition, the second thin plate member 23 has notch portions 23*m*, 23*n* formed in both side edges which face each other across the second optical axis O2 when the shock absorbing means 26 is mounted to the optical housing 4.

In correspondence thereto, engagement protrusions 2*m*, 2*n* are formed on the inner surface of the containing portion 2*x* of the front cover member 2 at the regions facing the notch portions 23*m*, 23*n* when the optical housing 4 having the shock absorbing means 26 mounted is contained in the containing portion 2*x* (camera body side) of the front cover member 2.

In this way, when the optical housing 4 to which the shock absorbing means 26 is mounted is contained in the containing portion 2*x* of the front cover member 2, each of the notch portions 23*m*, 23*n* of the second thin plate member 23 is respectively engaged with the engagement protrusions 2*m*, 2*n* of the containing portion 2*x*. In this way, the second thin plate member 23 is fixed to the front cover member 2 with its movement in the direction along the second optical axis O2 (X-axis direction of FIG. 4) being restricted.

As shown in FIG. 5, a plurality of hole portions are formed near the substantially middle portion of the second thin plate member 23. The hole portions are for letting out surplus adhesive or the like at the time of bonding fixation between the shock absorbing member 24 and the second thin plate member 23.

As described above, since the shock absorbing means 26 is disposed between the inner surface of the front cover member 2 (in the containing portion 2*x*) and the front surface (at least one outer surface) of the optical housing 4, when the optical housing 4 is displaced by sliding in the direction along the second optical axis O2 relatively in the camera body of the digital camera 1 by external shock, for example, the shock can be absorbed by shearing force in the second optical axis O2 direction generated between the inner surface portion of the camera body (the inner surface of the containing portion 2*x* of the front cover member 2) and the outer surface portion of the optical housing 4 (the front surface of the optical housing 4).

In other words, since the shock absorbing member 24 is made of a resilient rubber-based member as mentioned above, when external force (including the component force in the X-axis direction) in the shear direction, that is, the direction along the second optical axis O2 of the optical housing 4 (the direction along the X-axis of FIG. 4; the direction in which the optical lenses move) is applied, the optical housing 4 is moved to some extent in the same direction (the direction along the second optical axis O2, that is, the direction along the X-axis) relatively to the camera body (the front cover member 2) by shear deformation of the shock absorbing member 24.

In this case, the arrangement of the optical housing 4 with respect to the inner surface of the front cover member 2 is defined such that some amount of gap is formed in the regions indicated by reference numerals A, B in FIGS. 2, 3, that is, in the predetermined regions between both ends of the optical housing 4 in the direction of movement (the second optical axis direction) and the inner surface of the camera body. By the gaps A and B, the optical housing 4 is allowed to move in the direction along the second optical axis O2 (the direction along the X-axis) thereby to avoid interference of the optical housing 4 with the camera body.

The gaps A and B are set by considering various factors such as the resilient force determined by the material of the shock absorbing member 24, the shock absorbing ability in the shear direction, the weight of the optical housing 4, the weight of the digital camera 1 itself, and the amount of external force applied by shock or the like.

Here, as for the gaps A and B, sufficient length should be secured when the amount of movement of the optical housing 4 is considered, for example; however, if a very large amount of shock force is assumed, for example, an unnecessarily large length of gap will be secured, thereby the requirement for reduction of the size of the camera body cannot be met. Therefore, in designing, it is necessary to take into consideration reduction of the size of the device as well. As for the small size camera or the like adopted in the present embodiment, the length of the gaps A and B in the order of about 1 mm, respectively, is secured.

The shock absorbing member 24 may be arranged between the rear side of the optical housing 4 and the plate form holding member 21, or may be arranged on both front surface and rear surface of the optical housing 4.

Next, the detailed configuration of the lens barrier member and the optical housing 4 will be described using FIG. 6 and FIGS. 8 to 10.

Figure 8:
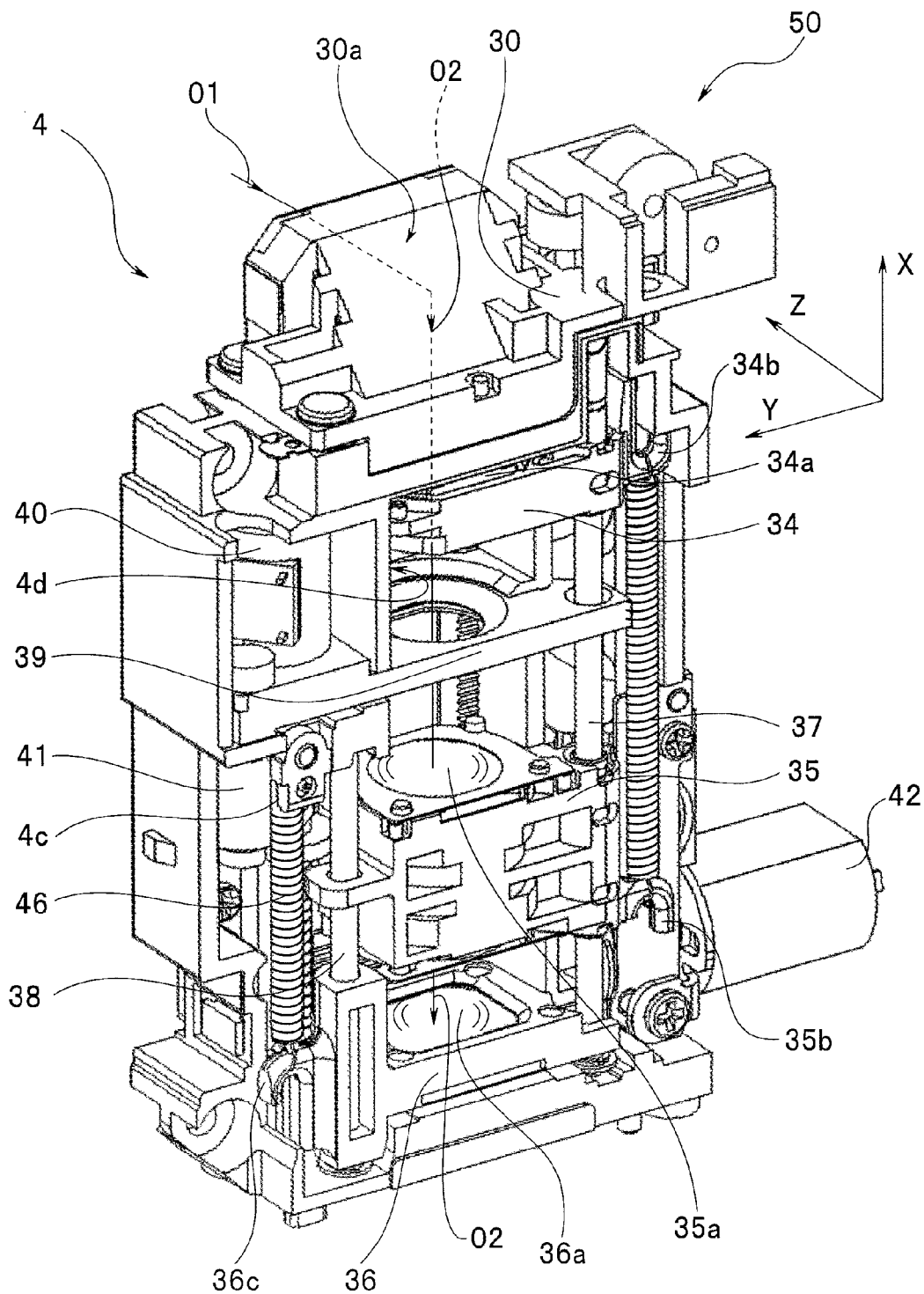
FIG. 8 is a perspective view of the external appearance of the optical housing of the digital camera of the present embodiment, showing the same being brought out.

As shown in FIG. 8, a first lens retaining frame 30 is fixedly coupled to the top of the optical housing 4 provided in the digital camera 1 adopted in the present embodiment. In the first lens retaining frame 30, a prism 30*a* is arranged which receives light flux entering from the front side and guides the first optical axis O1 thereof to the direction along the second optical axis O2, that is, to the bottom side of the optical housing 4.

The optical housing 4 is mainly constituted by its main constituent members such as the prism 30*a* for bending the optical axis of entering light flux and the first lens retaining frame 30 for retaining the same, a lens frame unit, a shutter frame 39 having a shutter device and the like, a shutter driving motor 40 fixedly provided in the shutter frame 39 for driving the shutter device, a shutter driving member (not shown) for transmitting driving force of the shutter driving motor 40 to the shutter device of the shutter frame 39, a focusing motor 41 for driving a focusing lens group, a focusing driving member (not shown) for transmitting driving force of the focusing motor 41 to the focusing lens group, a lens barrier drive unit 50 having a lens barrier member 51 (described later, see FIGS. 6, 9 and the like), a zooming motor 42 for driving a magnification changing lens group and the lens barrier member 51, a driving force generating member for transmitting driving force of the zooming motor 42 to the magnification changing lens group, and an electrical board having the image pickup device 25 mounted.

The above-mentioned lens frame unit is constituted by a plurality of optical lens groups (34a, 35a, 36a) for forming an image of a photographic object at a predetermined location and a plurality of lens retaining frames (34, 35, 36) for retaining optical lenses which constitute the respective lens groups, a plurality of shaft members (37, 38) for retaining the lens retaining frames (34, 35, 36) so as to be movable in the direction along the optical axis O2, and the like. More specifically, as shown in FIG. 8, the lens frame unit is constituted by the first lens retaining frame 30 fixed to the camera body retaining a first lens group (not shown) including a protective lens disposed toward the front side, the prism 30a and the like, a second lens retaining frame 34 for retaining a second lens group 34a which is a movable lens group movable in the direction of an arrow X in FIG. 8, that is, the direction along the second optical axis O2, a third lens retaining frame 35 for retaining a third lens group 35a movable in the same direction, a fourth lens retaining frame 36 for retaining a fourth lens group 36a, a first support shaft 37 for guiding in the second optical axis O2 direction, slidably fitting with the second lens retaining frame 34 and the third lens retaining frame 35 and imparting rotation stopping function with the fourth lens retaining frame 36, a second support shaft 38 for guiding in the second optical axis O2 direction, fitting to a hole in a fixing portion 36c of the fourth lens retaining frame 36 and imparting rotation stopping function with the third lens retaining frame 35, a first spring 45 having one end engaged with a fixing portion 34b of the second lens retaining frame 34 and the other end engaged with a fixing portion 35b of the third lens retaining frame 35, tensioned between the second lens retaining frame 34 and the third lens retaining frame 35, a second spring 46 having one end engaged with a fixing portion 4c of the optical housing 4 and the other end engaged with a fixing portion 36c of the fourth lens retaining frame 36, tensioned between the fourth lens retaining frame 36 and the optical housing 4, a shutter unit fixedly provided between the second lens retaining frame 34 and the third lens retaining frame 35, and the like.

Further, in each of the second lens retaining frame 34 and the third lens retaining frame 35, a cam pin (not shown) driven by a cam provided on a later-described zoom driving cam shaft 43a (see FIG. 10 and the like) is provided.

The second lens retaining frame 34 has a protruding guided portion (not shown) provided at the other end thereof, where it is not fitted with the first support shaft 37. A groove portion (not particularly shown) is provided in the direction along the second optical axis O2 in a fixing wall portion 4d of the optical housing 4. By the guided portion being guided by the groove portion (neither of them is shown), movement of the second lens retaining frame 34 in the second optical axis O2 direction is guided as well as rotation of the second lens retaining frame 34 about the first support shaft 37 is restricted.

The third lens retaining frame 35 is slidably fitted with the first support shaft 37 at one end and is guided at the other end so as not to rotate about the second support shaft 38. The fourth lens retaining frame 36 is guided at one end so as not to rotate about the first support shaft 37 and is slidably fitted with the second support shaft 38 at the fixing portion 36c on the other end. The fourth lens retaining frame 36 is driven by the driving force from the focusing motor 41 with an unshown drive mechanism at the time of focusing.

By the first spring 45, the second lens retaining frame 34 and the third lens retaining frame 35 are biased in the direction along the optical axis O2, upward in FIG. 8, by the resilient force in the direction of compression; further, they are biased such that the cam pins (not shown) provided on each of the second lens retaining frame 34 and the third lens retaining frame 35 are pressed to a second frame cam 43b and a third frame cam 43c as a first cam portion provided on a zoom driving cam shaft 43a. The second spring 46 biases the fourth lens retaining frame 36 to the optical housing 4 in the direction along the second optical axis O2 upward in FIG. 8.

Next, a configuration of the driving force generating member and the driving force transmitting member of the digital camera 1 adopted in the present embodiment will be described in detail using FIGS. 8 to 13.

Figure 10:
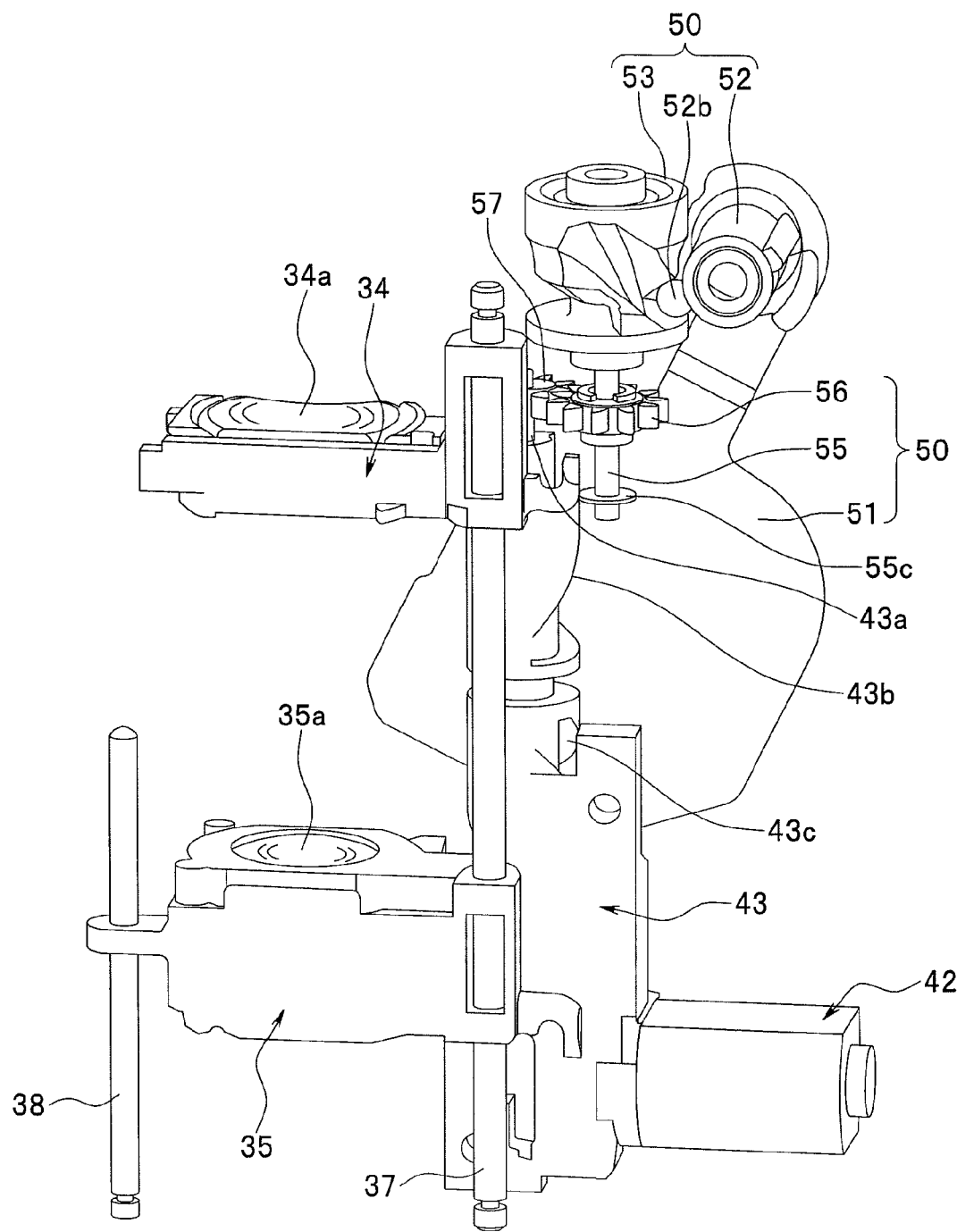
FIG. 10 is a perspective view showing the lens frame unit and the lens barrier drive unit of the optical housing of the digital camera of the present embodiment, being brought out.

Reference numeral 42 in FIGS. 8 and 10 denotes a zooming motor, reference numeral 43 denotes a rate reduction unit for reducing the speed of the rotational driving force of the zooming motor 42, and reference numeral 43a denotes a zoom driving cam shaft rotationally driven by the driving force reduced in speed by the rate reduction unit 43.

The second frame cam 43b and the third frame cam 43c for transmitting driving force to the third lens retaining frame 35 and the fourth lens retaining frame 36 are provided on the zoom driving cam shaft 43a. In addition, a first barrier gear 57 (first gear) for transmitting driving force to a later-described second barrier gear 56 (second gear) which is the final output gear is fixedly provided at the tip portion of the zoom driving cam shaft 43a.

The driving force from the first barrier gear 57 (first gear) is transmitted to the second barrier gear 56 (second gear), and is transmitted to a lens barrier drive unit 50 through a barrier cam shaft 55 on which the second barrier gear 56 is fixedly provided; the zooming motor 42 is controlled by predetermined sequence; and the lens barrier member 51 is opened and closed.

Figure 9:
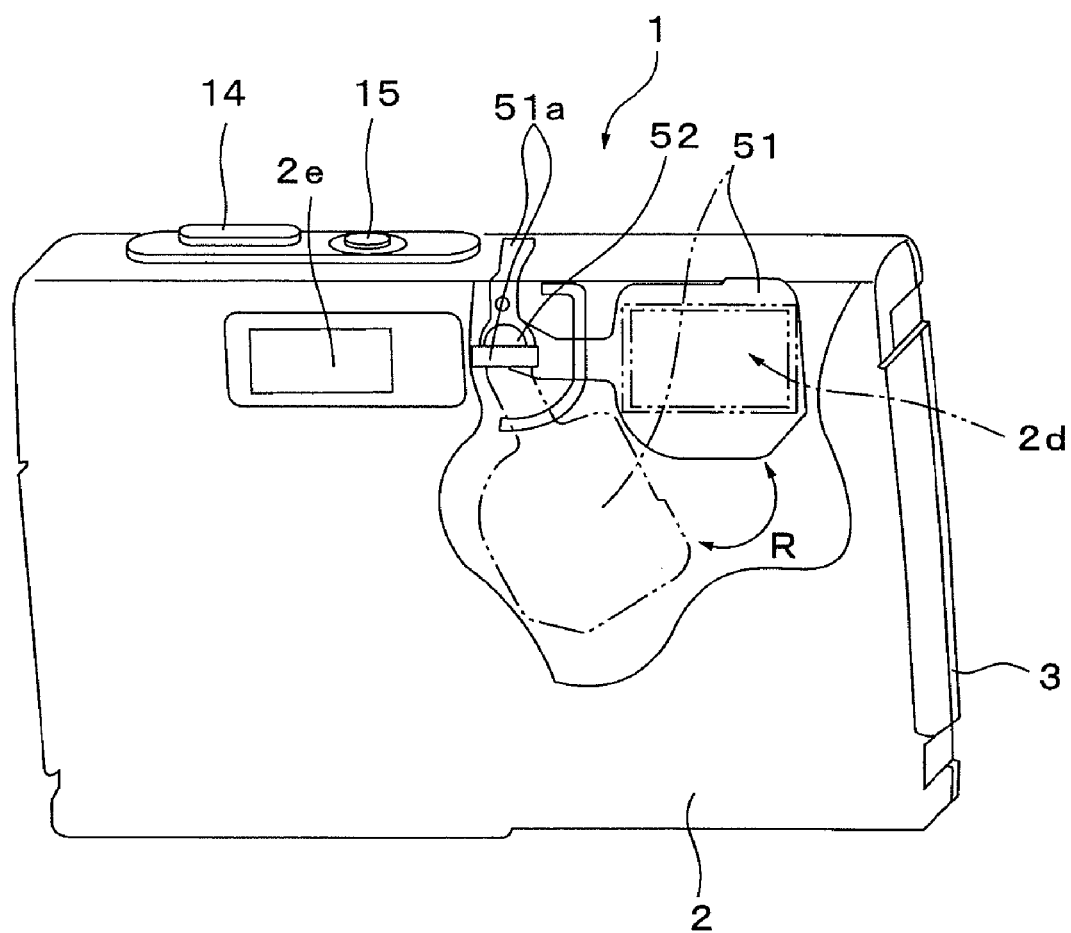
FIG. 9 is a view showing an arrangement of the lens barrier member in the digital camera of the present embodiment.

As shown in FIG. 9, the lens barrier drive unit 50 for driving the lens barrier member 51 described above is disposed on the camera body near the first lens retaining frame 30. The driving force from the zooming motor 42 is transmitted to the lens barrier drive unit 50 through the first barrier gear 57 (first gear).

As shown in FIG. 10, the lens barrier drive unit 50 has the second barrier gear 56 (second gear) meshing with the first barrier gear 57 (first gear), the barrier cam shaft 55 on which the second barrier gear 56 is fixedly provided, arranged on a fixing portion 4a which is part of the optical housing 4 so as to be rotatable and movable in the second optical axis O2 direction with respect to the fixing portion 4a, a barrier cam member 58 as the second cam portion arranged on the camera body and having a hole portion 54a to be fitted with a tip portion 55a of the barrier cam shaft 55 so as to be non-rotatable and movable in the optical axis O2 direction, and a barrier lever 52 which rotates under driving force from the barrier cam member 58. The constructions of the lens barrier drive unit 50 are provided on the camera body (in the present embodiment, the front cover member 2).

The zooming motor 42, rate reduction unit 43, zoom driving cam shaft 43a and first barrier gear 57 constitute a driving force generating member. The lens barrier drive unit 50 constitutes a driving force transmitting member.

The lens barrier member 51 is fixedly provided on the barrier lever 52 which constitutes part of the lens barrier drive unit 50. As shown in FIG. 9, the lens barrier member 51 is configured so as to move between a position (a position shown in solid line in FIG. 9) to cover an opening 2d (shown in double-dotted chain line in FIG. 9) which is a photographing window provided in the front cover member 2 of the digital camera 1, and a position (shown in double-dotted chain line in FIG. 9) to open the opening 2d, by means of the barrier lever 52.

Next, the above-mentioned barrier cam shaft 55 and the barrier cam member 58 will be described in more detail using FIGS. 12, 13.

An E-ring 55c is fixedly provided on an end portion 55b of the barrier cam shaft 55 opposite from the barrier cam member 58. The E-ring 55c prevents the barrier cam shaft 55 from getting out of the optical housing 4 when the barrier cam shaft 55 moves in the second optical axis O2 direction together with the optical housing 4 by external shock.

In addition, a retaining flange 4a1 is formed on the barrier cam shaft 55 between the second barrier gear 56 and the E-ring 55c. The retaining flange 4a1 is mounted to a concave portion 4a2 formed in the fixing portion 4a which is part of the optical housing 4. With the flange 4a1 mounted to the concave portion 4a2, the barrier cam shaft 55 is supported so as to be rotatable and movable in the second optical axis O2 direction with respect to the fixing portion 4a. In the case, the distance between the back surface (the surface on the side of the tip portion of the fixing portion 4a) of the E-ring 55c and the bottom surface of the concave portion 4a2 is set to be longer than a distance E between the bottom surface of the concave portion 4a2 and the tip portion of the fixing portion 4a of the optical housing 4.

Meanwhile, the barrier cam member 58 has a barrier cam 53 formed on the outer peripheral surface thereof and has a hole portion 54a formed in the position where the other end of the barrier cam shaft 55 is inserted. A cam follower 52b of the barrier lever 52 contacts with the barrier cam 53 so as to move along the cam. Therefore, when the barrier cam member 58 is rotated by the barrier cam shaft 55, the barrier cam 53 also rotates and then the cam follower 52b of the barrier lever 52 rotates along the barrier cam 53 to a predetermined position while keeping a contacting state. By the rotation, the lens barrier member 51, which is fixedly provided coaxially with the rotational center of the barrier lever 52, also rotates within a predetermined range.

Figure 13:
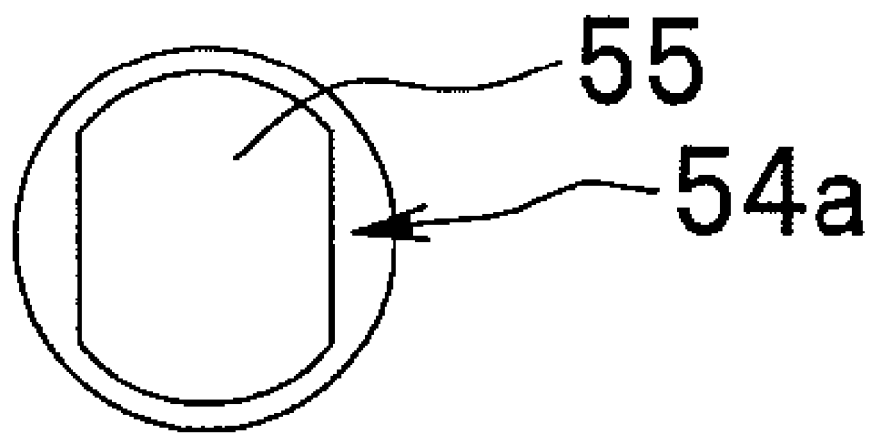
FIG. 13 is a sectional view along XIII-XIII of FIG. 12.

Here, the rotational center of the barrier cam shaft 55 coincides with the rotational center of the hole portion 54a of the barrier lever 52, the barrier cam shaft 55 and the hole portion 54a being engaged relatively movably in the axial direction while rotating together when rotated, as shown in FIG. 13.

Figure 11:
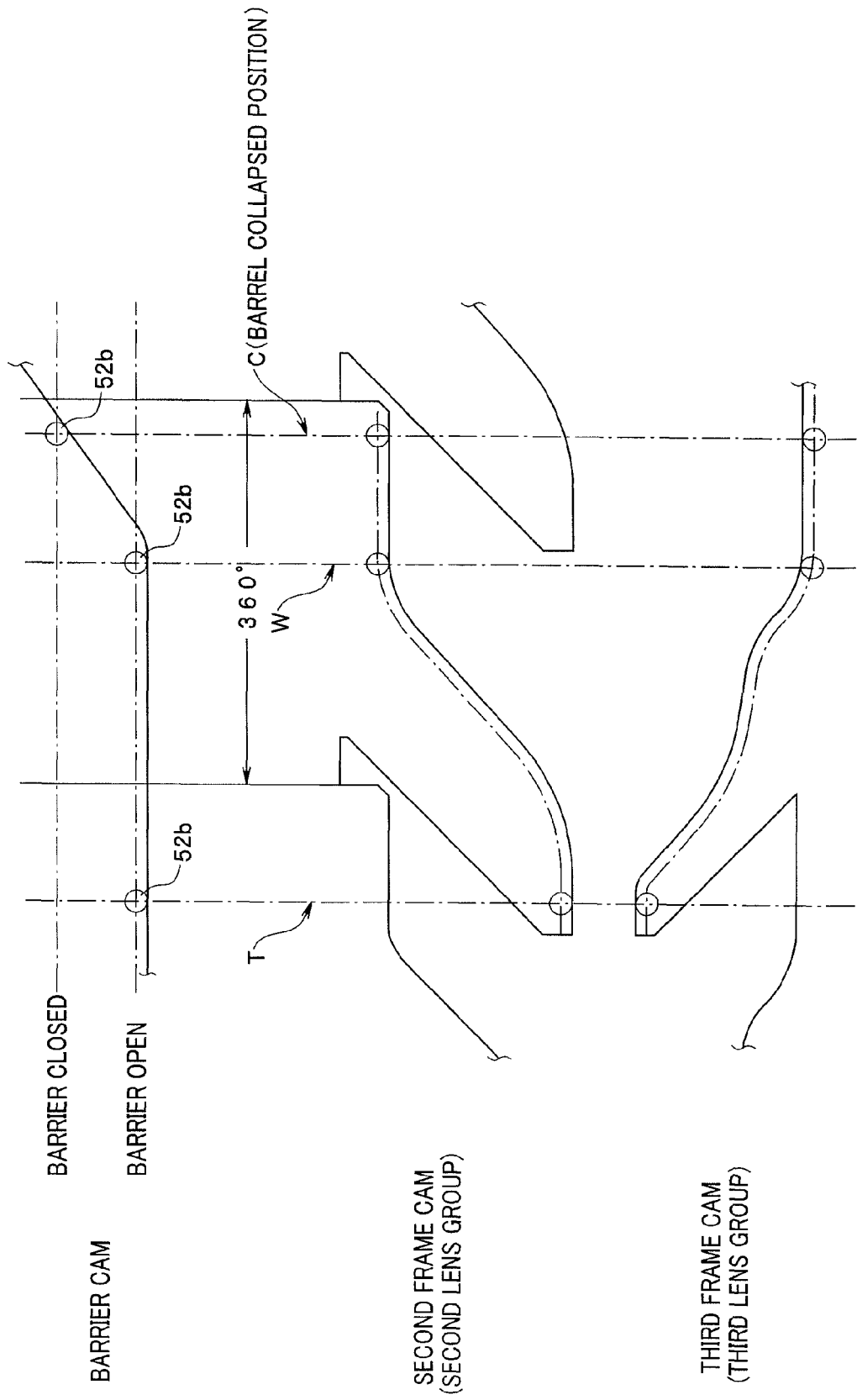
FIG. 11 is a cam development view of a barrier cam, second frame cam and third frame cam of the digital camera of the present embodiment.

Next, with reference to FIG. 11, operation of the barrier cam 53 which drives the lens barrier member 51 through the cam follower 52b, as well as of the second frame cam 43b which drives the second lens retaining frame 34 and the third frame cam 43c which drives the third lens retaining frame 35, provided on the zoom driving cam shaft 43a, will be described. In FIG. 11, development views of the cams 53, 43b and 43c are shown.

Reference numeral C in FIG. 11 indicates the position of the cam follower 52b in the case where the power source of the digital camera 1 is in an off-state and the lens barrier member 51 is in the position to cover the opening 2d (shown in double-dotted chain line in FIG. 9) which is the photographing window of the digital camera 1 (see FIG. 9), and the position of the cam in the case where the lens groups are in the barrel collapsed position.

When the power source of the digital camera 1 becomes an on-state and the zoom driving cam shaft 43a is driven, first, the barrier cam shaft 55 rotates; the barrier cam member 58 rotates in cooperation therewith; and the cam follower 52b is driven by the barrier cam 53 provided on the outer periphery of the barrier cam member 58. Then, the barrier member 51 is displaced from the barrier-closed position to the barrier-open position by the drive of the cam follower 52b.

After the barrier member 51 is displaced to the barrier open position, upon operation of a zoom switch, the second lens retaining frame 34 and the third lens retaining frame 35 having been positioned at a wide-angle position W are driven in a range up to a telephoto position T by the second frame cam 43b and the third frame cam 43c provided on the zoom driving cam shaft 43a in response to a signal by the operation.

In this way, the barrier cam 53 is set so as not to contribute to zooming operation of the second frame cam 43b and the third frame cam 43c, which are zoom driving cams. When zooming operation is being performed, that is, when operation is in between the telephoto position indicated by reference numeral T and the wide-angle position indicated by reference numeral W in FIG. 11, the barrier cam 53 operates so as to maintain the lens barrier member 51 always in the open position.

Next, operation of the digital camera 1 adopted in the present invention will be briefly described.

When the power source of the digital camera 1 becomes on-state and the zooming motor 42 rotates, the driving force of the zooming motor 42 is reduced in speed by the rate reduction unit 43 and is transmitted to the zoom driving cam shaft 43a. Then, the zoom driving cam shaft 43a starts to rotate, and control is performed such that driving force is not transmitted to the third and fourth lens retaining frames 35 and 36 until the barrier member 51 is displaced from the barrier closed position to the barrier open position as described above.

Meanwhile, the first barrier gear 57 is driven by rotation of the zoom driving cam shaft 43a, and the second barrier gear 56 meshing with the first barrier gear 57 is rotationally driven. Since the second barrier gear 56 is fixed to the barrier cam shaft 55, the barrier cam shaft 55 is rotationally driven and, in cooperation therewith, the barrier cam member 58 rotates. Then, the cam follower 52b is driven by the barrier cam 53 provided on the outer periphery of the barrier cam member 58; the barrier member 51 is displaced from the barrier-closed position to the barrier-open position by the drive of the cam follower 52b.

After the barrier member 51 is displaced from the barrier-closed position to the barrier-open position, upon operation of the zoom switch, the zooming motor 42 is controlled in response to a signal by the operation, and the zoom position of the lens retaining frames is controlled between the wide-angle position W and the telephoto position T.

Next, operation of the optical housing 4, the lens barrier drive unit 50 and the lens barrier member 51 in the case where external shock is applied to the camera body will be described.

As described above, the optical housing 4 of the digital camera 1 of the present embodiment is allowed to move only in the direction along the second optical axis O2, in the containing portion 2x of the front cover member 2 provided in the camera body.

Therefore, when external shock is applied to the camera body by dropping or the like, the optical housing 4 is relatively displaced by sliding in the direction along the second optical axis O2 in the containing portion 2x of the front cover member 2 by force (including component force) in the direction along the second optical axis O2. In the case, there is a possibility that engagement between the first barrier gear 57 fixedly provided on the zoom driving cam shaft 43a provided on the optical housing 4 side and the second barrier gear 56 provided on the front cover member 2 side is released, and the transmission path of driving force is interrupted.

Thus, in the present embodiment, the link portion between the barrier cam shaft 55 and the barrier cam member 58 is configured in the following manner so that the barrier cam shaft 55 on which the second barrier gear 56 is fixedly provided and the optical housing 4 can both be displaced by sliding in the direction along the second optical axis O2.

That is, as described above, the barrier cam member 58 has a hole portion 54a provided therein, being configured so as to transmit rotational driving force integrally with the barrier cam shaft 55 in the rotational direction and be relatively movable in the axial direction.

Further, the design is such that sufficient insertion length D2 (FIG. 12) of the tip portion 55a of the barrier cam shaft 55 inserted in the hole portion 54a can be secured; as well as distance D1 (FIG. 12) by which the barrier cam shaft 55 moves in the hole portion 54a upon application of shock to the camera body is secured.

Figure 12:
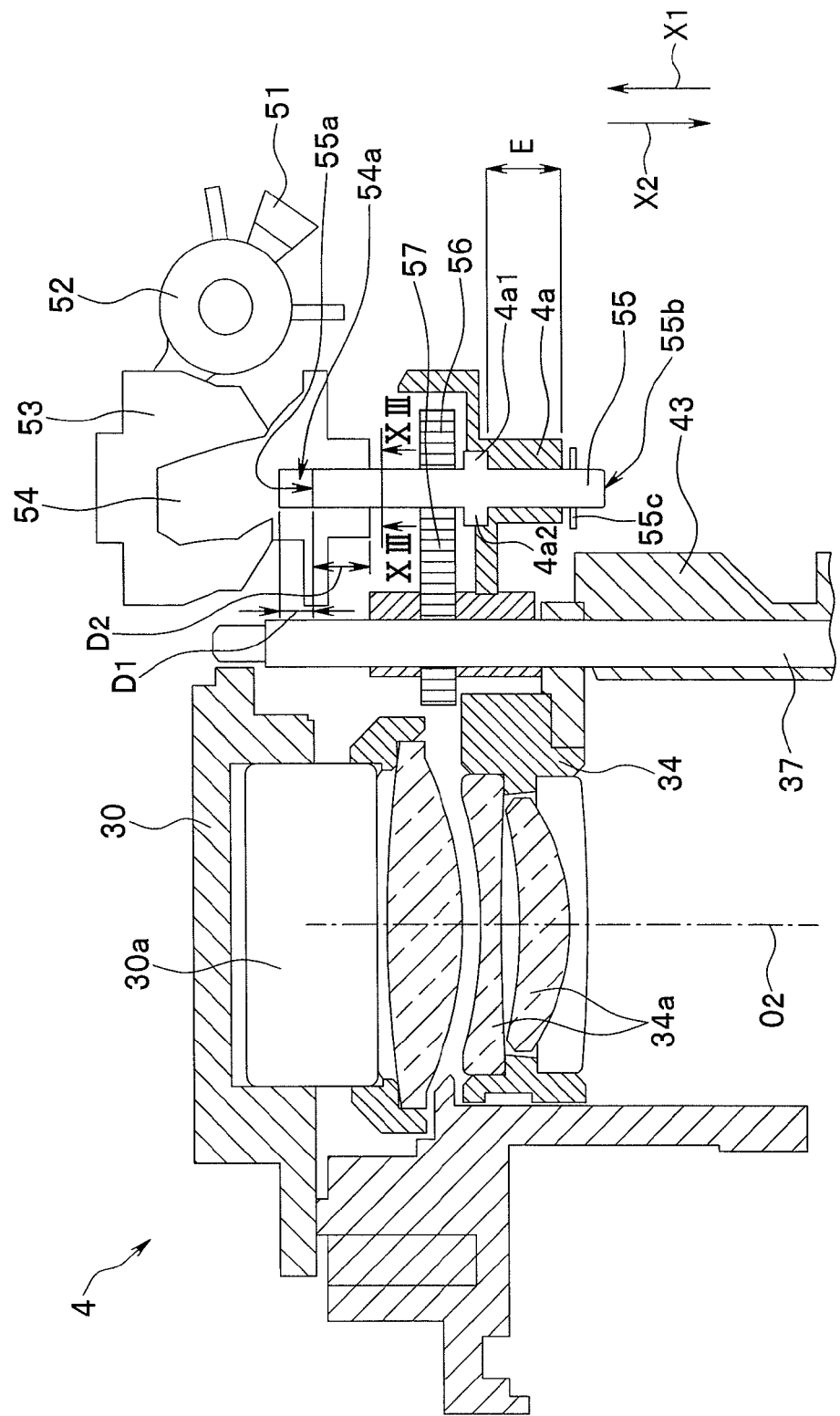
FIG. 12 is an enlarged sectional view of essential part for explaining the shock absorbing mechanism of the lens barrier drive unit of the digital camera of the present embodiment.

The distance D1 is set to be equal to or a little longer than the maximum movement amount (the gaps A and B shown in FIG. 3) in the case of the optical housing 4 moving in the direction of an arrow X1 in FIG. 12, for example.

In other words, the setting is such that when the optical housing 4 is displaced by sliding relatively in the direction of the gap A shown in FIG. 3 in the containing portion 2x of the front cover member 2 by shock, the distance (D2) by which the barrier cam shaft 55 can move in the hole portion 54a provided in the barrier cam member 58 is longer than the distance by which the optical housing 4 moves.

In addition, in order to prevent the insertion state of the barrier cam shaft 55 and the hole portion 54a from being released when the optical housing 4 is displaced by sliding relatively in the direction (direction of an arrow X2) of the gap B shown in FIG. 3 in the containing portion 2x of the front cover member 2, the insertion length D2 shown in FIG. 12 is set to be longer than the maximum movement distance of the optical housing 4.

As described above, according to the present embodiment, when the optical housing 4 is displaced by sliding in the direction along the second optical axis O2 relatively in the containing portion 2x of the camera body by shock, the barrier cam shaft 55, which is part of the driving force transmitting member, is displaced by sliding together with the optical housing 4. Moreover, movement in the axial direction between the barrier cam member 58 and the barrier cam shaft 55 is allowed. Therefore, a configuration is enabled such that the lens barrier member 51 in cooperation with the barrier cam member 58 is not affected by shock, while the driving relation between the barrier cam member 58 and the barrier cam shaft 55 is maintained.

Of course, the present invention is not limited to the above-described embodiment, and it is possible that various variations and applications can be implemented in a scope not departing from the gist of the invention. Further, inventions of various stages are included in the above-described embodiment; various inventions can be extracted by appropriate combination of a plurality of constituent requirements disclosed. For example, when some constituent requirements are deleted from the entire constituent requirements shown in the present embodiment, if a problem described in a section of problems to be solved by the invention can be solved and an effect described in effects of the invention can be obtained, a configuration with these constituent requirements deleted can be extracted as an invention.

What is claimed is:

1. A digital camera having:
    a lens group for reflecting photographic object light entering along a first optical axis to a second optical axis direction perpendicular to the first optical axis and forming an image of the reflected photographic object light on an image pickup device located on the second optical axis;
    a driving force generating member for generating driving force for driving the lens group as well as generating driving force for driving a barrier member which moves to a position to block the photographic object light entering along the first optical axis and a position to allow entrance of the photographic object light entering along the first optical axis; and
    a camera body, wherein
    the camera body has an optical housing being in a flat shape as a whole, a containing portion for containing the optical housing so as to be slidable only in the second optical axis direction and the barrier member arranged, as well as a driving force transmitting member for transmitting driving force from the driving force generating member to the barrier member,
    shock absorbing means is provided between an inner surface portion of the containing portion and an outer surface portion of the optical housing of the camera body, and
    a coupling relation between the driving force generating member and the driving force transmitting member is maintained even when the optical housing is displaced by sliding only in the second optical axis direction relatively in the containing portion by shock.

2. The digital camera according to claim 1, wherein
    the driving force generating member has a shaft member which moves with the optical housing when the optical housing is displaced by sliding only in the second optical axis direction relatively in the containing portion by shock,
    the driving force transmitting member has a hole portion with which the shaft member engages, and
    the shaft member and the hole portion are engaged so as to be slidable only in the second optical axis direction and together rotatable with respect to the second optical axis direction.

3. The digital camera according to claim 2, wherein
    the driving force generating member has a first cam portion for driving a lens group and a driving force transmitting member for transmitting driving force to the shaft member,
    the driving force transmitting member has a second cam portion to which driving force is transmitted from the shaft member when driving force is transmitted from the driving force transmitting member to the shaft member and which drives the barrier member, and
    the second cam portion is formed such that driving force is not transmitted to the barrier member when the lens group is driven by the first cam portion.

4. The digital camera according to claim 1, wherein length of coupling part of the driving force generating member and the driving force transmitting member is set to be longer than distance by which the optical housing moves when the optical housing is displaced by sliding in the second optical axis direction relatively in the containing portion by shock.

5. The digital camera according to claim 2, wherein length of coupling part of the driving force generating member and the driving force transmitting member is set to be longer than distance by which the optical housing moves when the optical housing is displaced by sliding in the second optical axis direction relatively in the containing portion by shock.

6. The digital camera according to claim 3, wherein length of coupling part of the driving force generating member and the driving force transmitting member is set to be longer than distance by which the optical housing moves when the optical housing is displaced by sliding in the second optical axis direction relatively in the containing portion by shock.

7. The digital camera according to claim 1, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

8. The digital camera according to claim 2, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

9. The digital camera according to claim 3, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

10. The digital camera according to claim 4, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

11. The digital camera according to claim 5, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

12. The digital camera according to claim 6, wherein: the shock absorbing means is formed by sandwiching a resilient shock absorbing member in a shape of thin flat plate between two thin plate members; the one thin plate member is fixedly provided on an inner surface portion of the containing portion; and the other thin plate member is fixedly provided on an outer surface portion of the optical housing.

* * * * *